(12) United States Patent
Salmonsen et al.

(10) Patent No.: US 6,636,468 B2
(45) Date of Patent: Oct. 21, 2003

(54) METHOD AND APPARATUS FOR LASER POWER CONTROL DURING RECORDING

(75) Inventors: Dan Salmonsen, Saratoga, CA (US); John Kelly, Menlo Park, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 98 days.

(21) Appl. No.: 09/818,055

(22) Filed: Mar. 26, 2001

(65) Prior Publication Data

US 2002/0136121 A1 Sep. 26, 2002

(51) Int. Cl.[7] .................................................. G11B 5/09
(52) U.S. Cl. .................................. 369/47.53; 369/53.27
(58) Field of Search ........................... 369/44.27, 44.28, 369/44.32, 44.33, 47.5, 47.51, 47.52, 47.53, 47.55, 53.26, 53.27, 53.31, 53.37, 116

(56) References Cited

U.S. PATENT DOCUMENTS

| 4,845,720 | A | 7/1989 | Koishi et al. |
|---|---|---|---|
| 5,212,678 | A | 5/1993 | Roth et al. |
| 5,216,660 | A | 6/1993 | Iimura |
| 5,436,880 | A | 7/1995 | Eastman et al. |
| 5,450,383 | A | 9/1995 | Call et al. |
| 5,463,607 | A | 10/1995 | Roth et al. |
| 5,790,491 | A | 8/1998 | Jaquette et al. |
| 5,825,729 | A | 10/1998 | Ogasawara et al. |
| 6,072,761 | A | 6/2000 | Tani |
| 6,122,302 | A | 9/2000 | Dean |
| 6,169,455 | B1 | 1/2001 | Yamaguchi |
| 6,317,405 | B1 | 11/2001 | Arai |
| 6,404,713 | B1 * | 6/2002 | Ueki ........................ 369/47.53 |

OTHER PUBLICATIONS

PCT Search Report, PCT/US02/09067, mailed Jun. 25, 2002, 5 pages.

* cited by examiner

*Primary Examiner*—Paul W. Huber
(74) *Attorney, Agent, or Firm*—Blakely Sokoloff Taylor & Zafman (57) ABSTRACT

A method comprises writing data to a disk using a write laser, and halting recording at a stopping point, prior to an end of the disk. The method further comprises reading the data recorded on the disk and evaluating the data. The method further comprises adjusting the characteristics of the write laser, if appropriate, and restarting the writing using the adjusted characteristics for the write laser.

44 Claims, 6 Drawing Sheets

METHOD AND APPARATUS FOR LASER POWER CONTROL DURING RECORDING

FIELD OF THE INVENTION

The present invention relates to recording on a medium, and more specifically, to laser control during recording on an optical medium.

BACKGROUND

Before user data is recorded, a test write is performed on a small segment of the media. For optical disks, this segment is along the inner radius of the disk. The test write writes at various power levels and write pulse shapes. By reading back the test written pattern, the optimum power level and pulse shape are set, for recording the user data. This process is referred to as "optimum power control" or OPC.

Figure 1A:
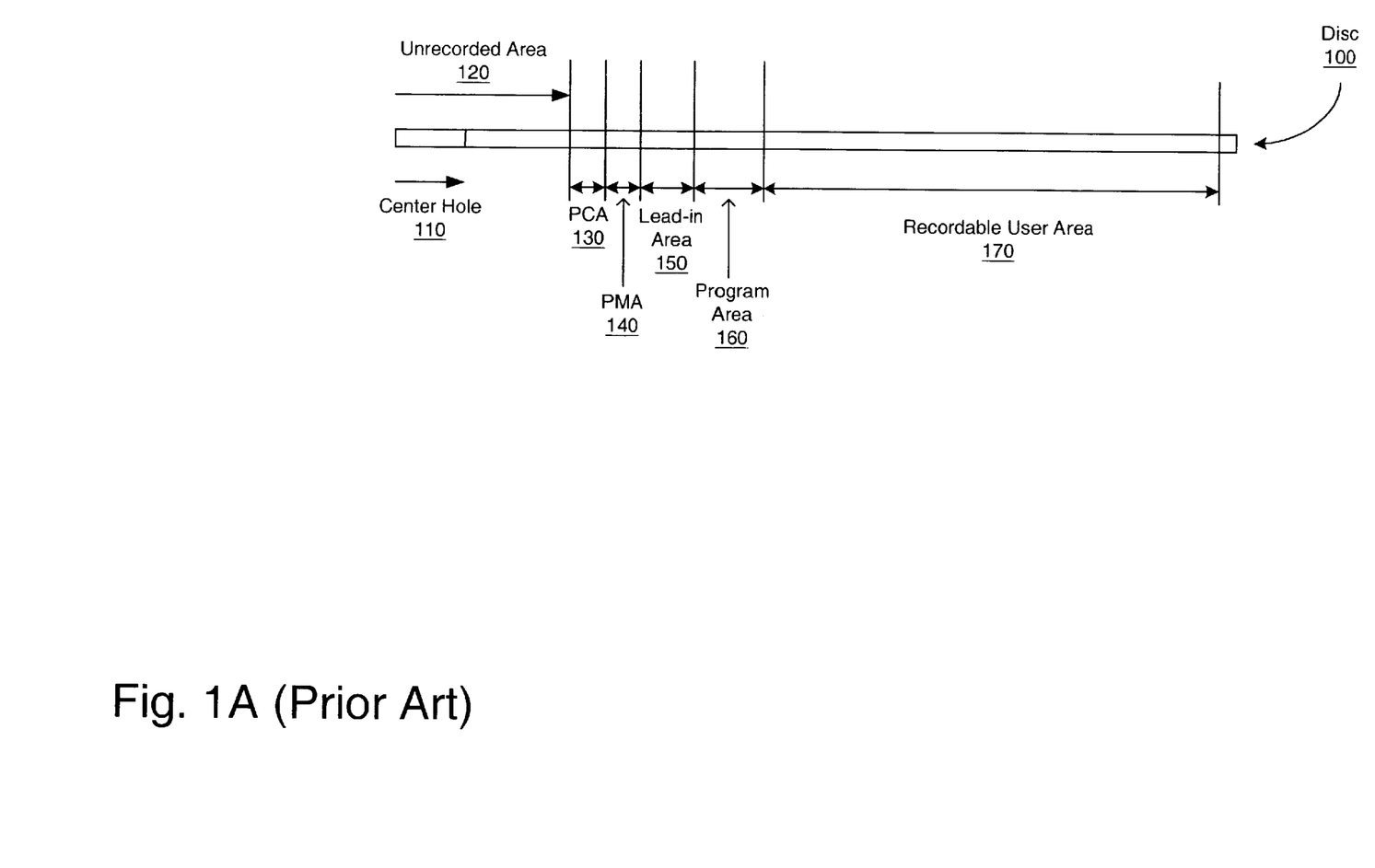
FIG. 1A is a side view of an optical medium, in accordance with the prior art.

The OPC process is performed before each write operation. However, OPC can produce inaccurate results, because a test write whose length is a fraction of a full revolution of the disk is used to determine the optimum write power. As can be seen in FIG. 1A, the disk 100 includes a small area for test data, labeled Power Calibration Area (PCA) 130 toward the inner portion of the disk 100. The PCA area 130 may be a fraction of a full revolution of the disk 100. This limitation is encoded in the Orange Book Standard for CD-R, which allocates a small area of the media to be used for OPC. The use of power calibration data from less than a full revolution of the disk may cause errors because of any of these issues: vertical and radial run out which cause focus and tracking errors, circumferential variations in the thickness of the recording layer or in the optical properties of the substrate, and localized errors in the test write area.

Additionally, the changes in optimum power for each write speed must be predicted from a minimal sample. As a result of using constant angular velocity (CAV) writing, instead of constant linear velocity (CLV), the spindle speed remains constant, and the tangential velocity of the recording head varies by more than 2:1. Because the test area and number of test writes is limited, as is the speed, the OPC for CAV writing predicts the optimum power for the entire range of write speeds by extrapolation based on one or two short test writes at the ID of the disk. Therefore, OPC has problems in setting the laser power and write format optimally.

Figure 1B:
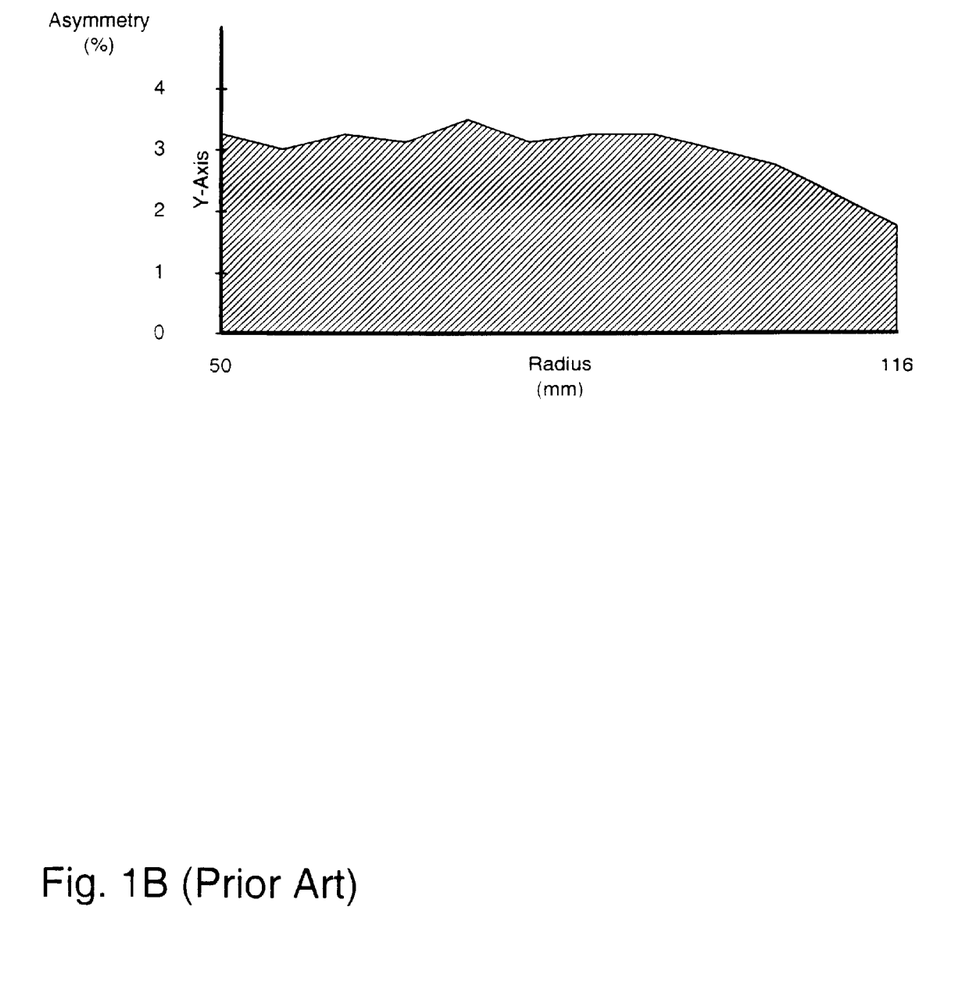
FIG. 1B is a graph illustrating the asymmetry versus radius for fixed power write of a compact disk.

FIG. 1B is a graph illustrating the asymmetry v. radius for fixed power write of a compact disk.

The "active" area of the disk, the area where information can be stored, ranges from I.D. (inside diameter)=4.6 cm to O.D. (outside diameter)=11.7 cm. As can be seen from FIG. 1B, the level of asymmetry from the inside diameter (ID) to the outside diameter (OD) varies due to irregularities in the thickness of the recording layer of the media. Traditional OPC, which is done at the ID, cannot predict the optimum power over the entire disc surface.

Figure 1C:
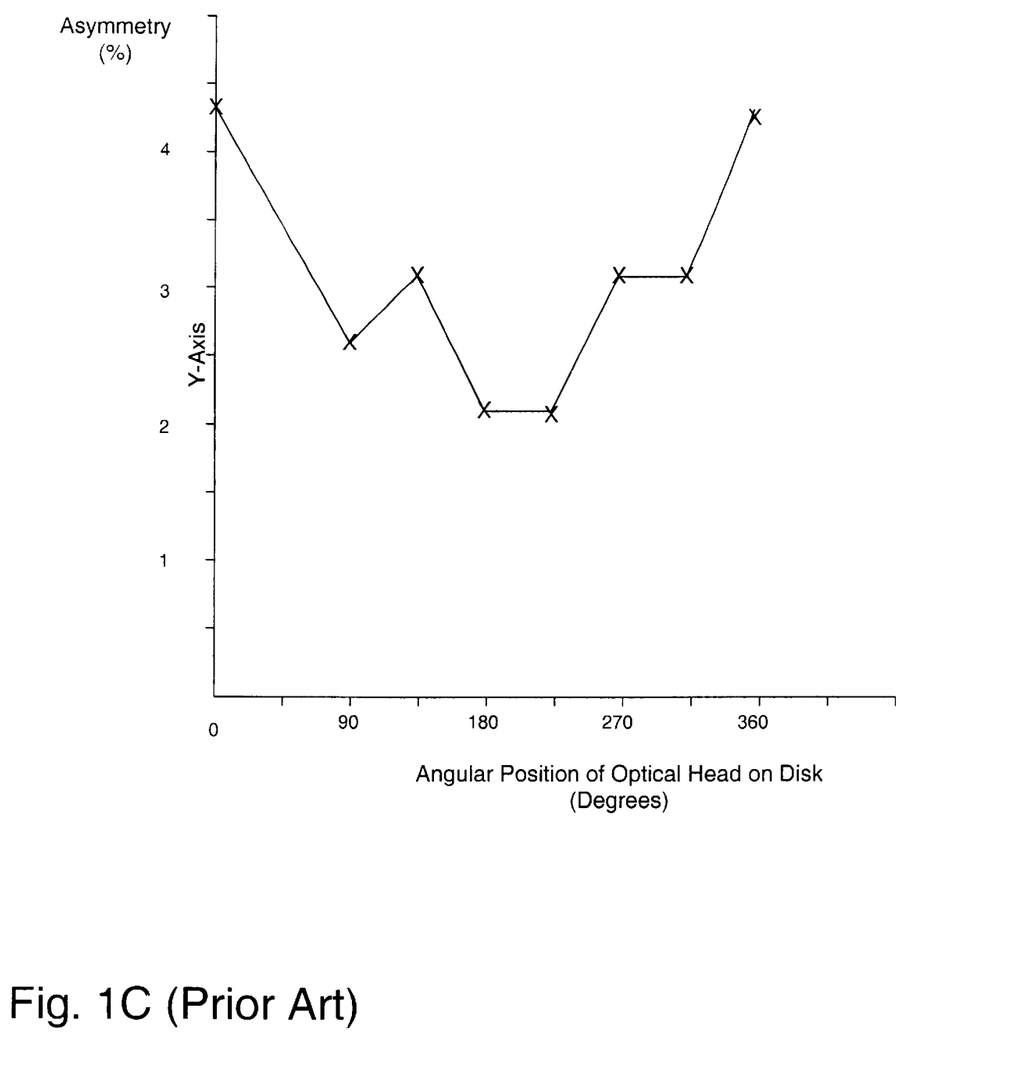
FIG. 1C is a graph illustrating the variation of the asymmetry as a function of angular position for a fixed power write of a compact disk.

FIG. 1C is a graph illustrating the variation of the asymmetry as a function of angular position for fixed power write of a compact disk. As can be seen from FIG. 1C, with constant write power, the asymmetry changes cyclically over one revolution of the disk. Hence, the traditional OPC procedure, which records data with fifteen different power levels, each of which occupies only a fraction of a revolution of the disk, is subject to error.

One prior art method of solving the issues of OPC is by using running optimum power control (ROPC). During the recording of user data, the amplitude of light reflected from the media during the writing of the marks that encode the user data may be monitored. The signature of the data, as it is being written, is compared to the data recorded during the OPC process. If the signature has changed, significantly, the power or write strategy is changed.

However, ROPC also has some shortcomings. ROPC adjusts the write power based on the read back data of the reflected write power. The predictive parameters are non-linear and have a low signal-to-noise ratio. They also may vary according to the manufacturer's process. This reduces the accuracy of the ROPC process.

SUMMARY OF THE INVENTION

A method and apparatus for improved laser control during writing. The method comprises setting characteristics of a write laser in a power calibration area of a disk and writing data to the disk using the characteristics set at the power calibration area. The method further comprising halting recording at a stopping point, prior to an end of the disk, and reading the data recorded on the disk. The method further comprising evaluating the data and adjusting the characteristics of the write laser, if appropriate, and restarting the writing using the adjusted characteristics for the write laser.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for improved laser control during writing on an optical medium is described. Link-less writing permits the stopping and restarting of the write process of an optical medium at any point during recording. The data that was written prior to the stopping point can then be read and evaluated for various characteristics. For example, the characteristics may include symmetry, error rate, jitter, or other metrics that are used to evaluate the quality of the read-back signal. The quality of the data being read indicates whether the write power and write strategy are correct. This evaluation may be done at an arbitrary time and place, and for an arbitrarily large number of frames. The laser power and signal being written can then be adjusted appropriately, to produce a better quality read-back signal.

The process is as follows. The write operation is initiated, and some data is written. For one embodiment, the write power and write strategy for the initial writing operation is set using traditional "optimum power control" (OPC) methodologies, that are known in the art. At one or more times during the write operation, the write process is halted, and the data that has been written is read. The data that has been written is evaluated, to determine whether the writing strategy and write power are correct. For one embodiment, traditional methods of evaluation may be used. The write strategy and power are then adjusted, if appropriate. The writing is then restarted. At this point, the writing uses the adjusted write strategy and write power. For one embodiment, the write restart may use a link-less restart methodology. This process may be repeated. For one embodiment, various triggers may start a write stop, strategy and power adjustment. For one embodiment, only a limited writing area prior to the stop is reviewed. For one embodiment, this stop-adjust levels-restart process only takes approximately 1 second.

The term "write strategy" refers to the method of adjusting the shape, (length and amplitude) of the laser pulse that forms the mark on a disk, such as CD-R or CD-RW media. The controlling factor in formation of the mark is how the media reacts to heating by the laser. For example, to make a mark of 3T in length on a CD-R disk, the laser is switched to 12 mW for ½T and then to 10 mW for 1½T. The initial high power is designed to quickly heat the media from ambient to the mark formation temperature. The power is then reduced to continue mark formation but it is switched off before 3T has elapsed because residual heat from the writing process will make the mark longer than the 2T that the laser was turned on. At higher writing speeds, the media must be heated more quickly so the starting power will be increased in length and amplitude. Formation of marks of more than 3T will use slightly different strategy. With CD-RW media, the laser is not only modulated off and on to form the correct size "marks," it is also modulated between write, erase and bias laser powers. Thus, the term "write strategy" refers to the length and amplitude of the laser pulses that form the marks on the disk.

Figure 2:
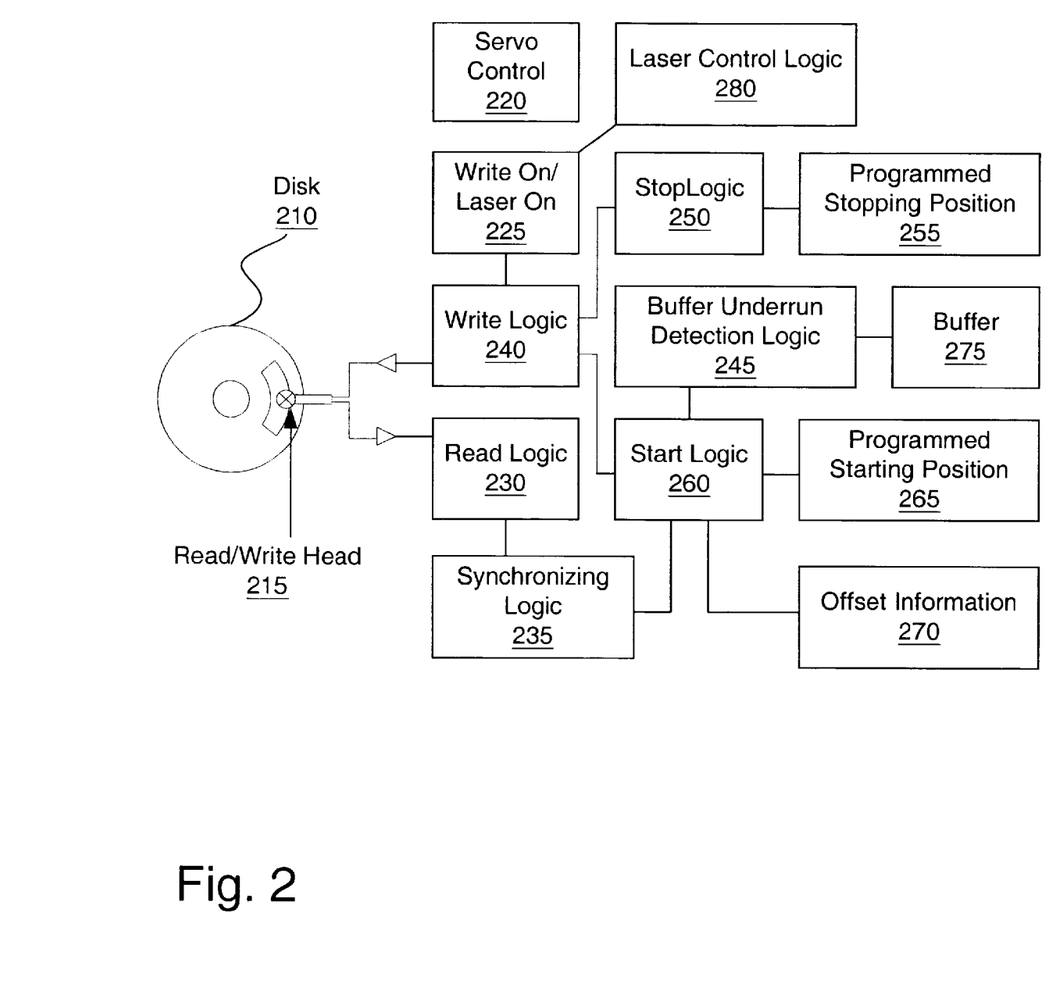
FIG. 2 is a block diagram of one embodiment of an optical writing system.

FIG. 2 is a block diagram of one embodiment of an optical writing system. The disk 210 is an optical medium that can be read and written to. For one embodiment, the disk 210 may be a compact disc, such as a CD-R, or CD-RW disk. For another embodiment, the disk 210 may be a DVD disk, or another type of optical medium.

A read/write head 215 is positioned over the disk 210. The read/write head is designed to read from and write to the disk 210. For one embodiment, the read/write head 215 may be two devices, one designed to read, and one designed to write. The read/write head includes a laser for writing to the disk 210, as is known in the art. The recording laser (not shown) is controlled by write on/laser on logic 225, which turns on the writing laser at a certain time, as will be discussed in more detail below.

The laser control logic 280 sets the power of the recording laser. The laser control logic 280 may further define the write strategy used by recording laser. The laser control logic 280 is shown in more detail in FIG. 3, below.

Servo control 220 controls the mechanical aspects of the movement of the disk 210 and read/write head 215, as is known in the art.

Write logic 240 writes data to disk 210. Write logic 240 receives data from small buffer (not shown), and after encoding the data, writes the data to disk 210. Write logic 240 is described in more detail in FIGS. 2A and 2B below.

Write logic 240 is controlled by start logic 260 and stop logic 250. Start logic 260 controls when write logic 240 starts to write, while stop logic 250 controls when write logic 240 stops writing.

Buffer underrun detection logic 245 detects when large buffer 275 is running low on data. Generally, buffer 275 is continuously filled. When the buffer underrun, the buffer underrun detection logic 245 detects that buffer 275 is running low, and may have a buffer underrun, the buffer underrun detection logic 245 passes this information to the stop logic 250, indicating that the stop logic 250 should stop the recording. The stop logic 250 determines when to stop the recording based on the programmed stopping position 255, which is stored in a register. For one embodiment, stop logic 250 stops the recording in the small frame after the buffer underrun detection logic 245 indicates that there is going to be a buffer underrun, at the location indicated by the programmed stopping position.

At the appropriate time, the stop logic 250 indicates to the write logic 240 that writing should be stopped. At that time, the write on/laser on logic 225 turns off or deflects the writing laser.

At a later time, the buffer underrun detection logic 240 may determine that the buffer 275 is sufficiently full that that recording should be restarted, and notify start logic 260. For another embodiment, another signal may indicate that it is time to restart recording. For example, the user may indicate that it is time to restart recording, directly to start logic 260.

Start logic 260 uses read logic 230 to derive a synchronization signal, to synchronize the about-to-be recorded data to the previously recorded data.

Start logic 260 determines the starting location based on the programmed starting position 265 and the offset information 270. The offset information 270 is determined based on a distance from the read/write head 215 to the read logic 230, and the time the read logic 230 takes to identify the data being read. The offset information 270 compensates for the time between when an area is actually under the read/write head 215 and when the read logic 230 identifies the information. For one embodiment, the offset information 270 is programmed by the OEM (original equipment manufacturer) who indicates the distance between the read/write head 215 and the read logic 230, while the system determines the time for the read logic 230 to identify the information.

The start logic 260 then uses the synchronizing data from synchronizing logic 235 to start writing new data, using write logic 240. In this way, the system can stop writing data to disk 210, and restart writing data, at pre-programmed points.

Although the above system illustrates one link-less restart mechanism, alternative restart mechanisms may be used. In that instance, start and stop logic, as well as programmed starting and stopping positions, and offset information may be eliminated. For example, an alternative mechanism may start and stop at the same location, or determine its starting position in some other way.

Figure 3:
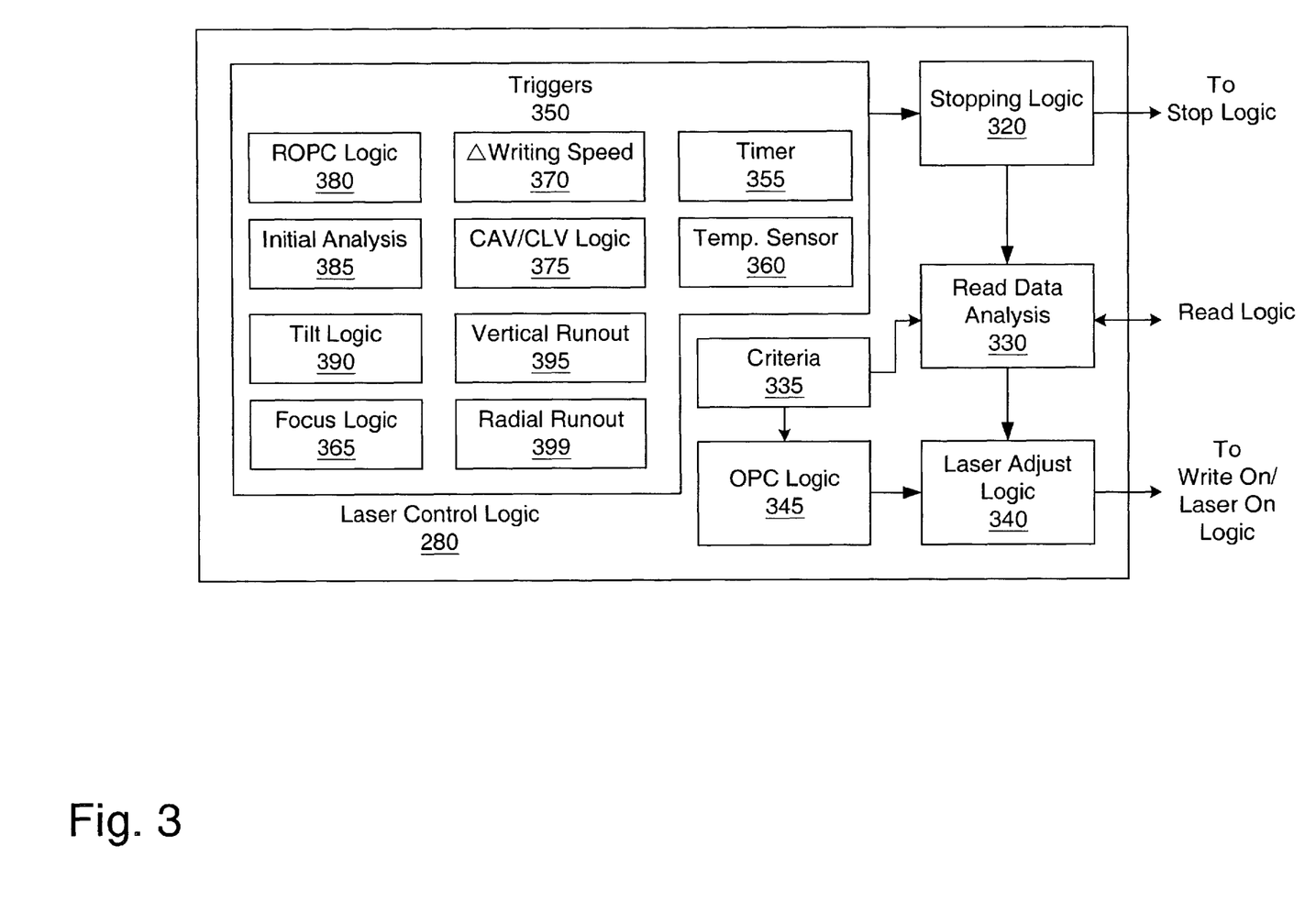
FIG. 3 is a more detailed block diagram of one embodiment of the laser control logic.

FIG. 3 is a more detailed block diagram of one embodiment of the laser control logic.

The laser control logic 280 includes an optimal power control (OPC) logic 345. The OPC logic 345 writes test data at various power levels and write pulse shapes at the inner radius of the disk. By reading back the test written pattern, the optimum power level and pulse shape are set, for recording the user data. This process is performed once, during the first write. The OPC logic 345 communicates the optimal write strategy and laser power to the laser adjust logic 340. The laser adjust logic 340 sets the writing laser's power and write strategy.

The laser control logic 280 includes a stopping logic 320, to indicate to the stop logic 250 that the writing should be stopped, for laser power/write strategy update. The stopping logic 320 receives its impetus from triggers 350. Triggers 350 monitor various states of the system, and trigger a stop, when a condition is met.

When the writing is stopped by stopping logic 320, the read data analysis logic 330 prompts the read logic 230 to read the data that was just written. The length of the data being read back may vary. For one embodiment, only the data within one full rotation of the disk is evaluated by data analysis logic 330. The analysis logic 330 compares the data being written with an "ideal" write strategy and power level. For one embodiment, the same criteria as used by the OPC logic 345 are used by the read data analysis logic 330. For one embodiment, the analysis may analyze symmetry, error rates, and jitter. This type of analysis is known in the art. However, it is generally used to analyze test data written in the OPC area. Alternatively, additional analysis methods may be used. For example, the analysis may include factors such as the location of the data, to compensate for variations within the disk. The read data analysis logic 330 then determines how to adjust the current write strategy/laser power to bring the data closer to the ideal. This is passed to the laser adjust logic 340, which alters the characteristics indicated by the read data analysis logic 330. The laser adjust logic 340 communicates with the laser on logic 225, to set the laser power and write strategy.

The triggers 350 that prompt a stop and reevaluation may include one or more timers 355. The timers 355 may periodically trigger a re-evaluation. A temperature sensor 365 may trigger a reevaluation if the temperature of the laser or disk is above a threshold. Since the disk reaction to the laser changes with temperature, this adjustment enables a compensation for the temperature change.

The triggers 350 may further include a writing speed change detector 370. Using the constant angular velocity (CAV) drive method, the disk rotates at a constant speed. The frequency of writing is changed as the drive head moves from the inside of the disk to the outside, to maintain a constant number of bits per inch. Using the constant linear velocity (CLV) drive method, each sector is the same physical size and the disc drive constantly varies the rate at which the disc is spinning so that as the read/write head moves toward the outer area of the disc, the disc slows down.

Thus, if CLV writing is used, the speed of writing toward the outside of the disk is much slower than the speed of writing at the inside, where the OPC testing occurred. The speed of writing may affect writing strategy, as well as the laser power needed to write. Therefore, the writing speed change detector 370 may detect if a writing speed is increased by a substantive factor (for example, the writing speed is greater than 1.5 times the writing speed at the last point at which the laser power and writing strategy were adjusted.)

The CAV/CLV logic 375 responds to a change in the drive method. Certain systems may change their drive method from constant linear velocity (CLV) to constant angular velocity (CAV) at a certain point on the disk. For one embodiment, there may be a limitation on how fast the disk may be spun. Thus, the inside area of the disk may be written using the CAV method, while the outside is written using the CLV method. After this change occurs, the system should reevaluate the write strategy and laser power. Therefore, the CAV/CLV logic 375 stops the writing a certain time after the switch from one drive method to another, to evaluate the data written by the new drive method, and appropriately adjust the power/write strategy as necessary.

The triggers 350 may further include initial analysis logic 385. The initial analysis logic 385 triggers a stop and reevaluation one or more times when writing is started. The initial analysis logic 385 verifies that the laser power and write strategy set by OPC logic 345 is correct. For one embodiment, initial analysis logic 385 may also be triggered when the laser power or write strategy are altered during the process. Thus, any time a new laser power and/or write strategy is implemented, the initial analysis logic 385 stops the writing after a period of time, for one embodiment a few revolutions of the disk, for follow-up analysis.

The triggers 350 may also include running optimum power control (ROPC) logic 380. During the recording of user data, the amplitude of light reflected from the media during the writing of the marks that encode the user data may be monitored. The signature of the data, as it is being written, is compared to the data recorded during the OPC process. If the signature has changed significantly, the ROPC logic 380 triggers a stop and reevaluation of the laser power and write strategy.

Triggers may further include mechanical variations, such as tilt 390, focus 365, vertical runout 395, and radial runout 399. These mechanical variations are generally cyclic in nature, i.e. they vary with the angular position of the disc. Additional mechanical variations that may be compensated for include beam deflection, vertical deviation, axial and radial acceleration difference, eccentricity. Other factors not listed here may also be corrected for. One skilled in the art is aware of the multitude of factors that may influence recording quality, and how these factors may vary as a result of time and location.

In this way, the laser control logic 280 monitors the writing process, and may stop the writing process to reevaluate the laser power and write strategy. For one embodiment, the laser control logic 280 may further be triggered by a write stop as a result of other conditions, i.e. buffer underrun, etc.

Figure 4:
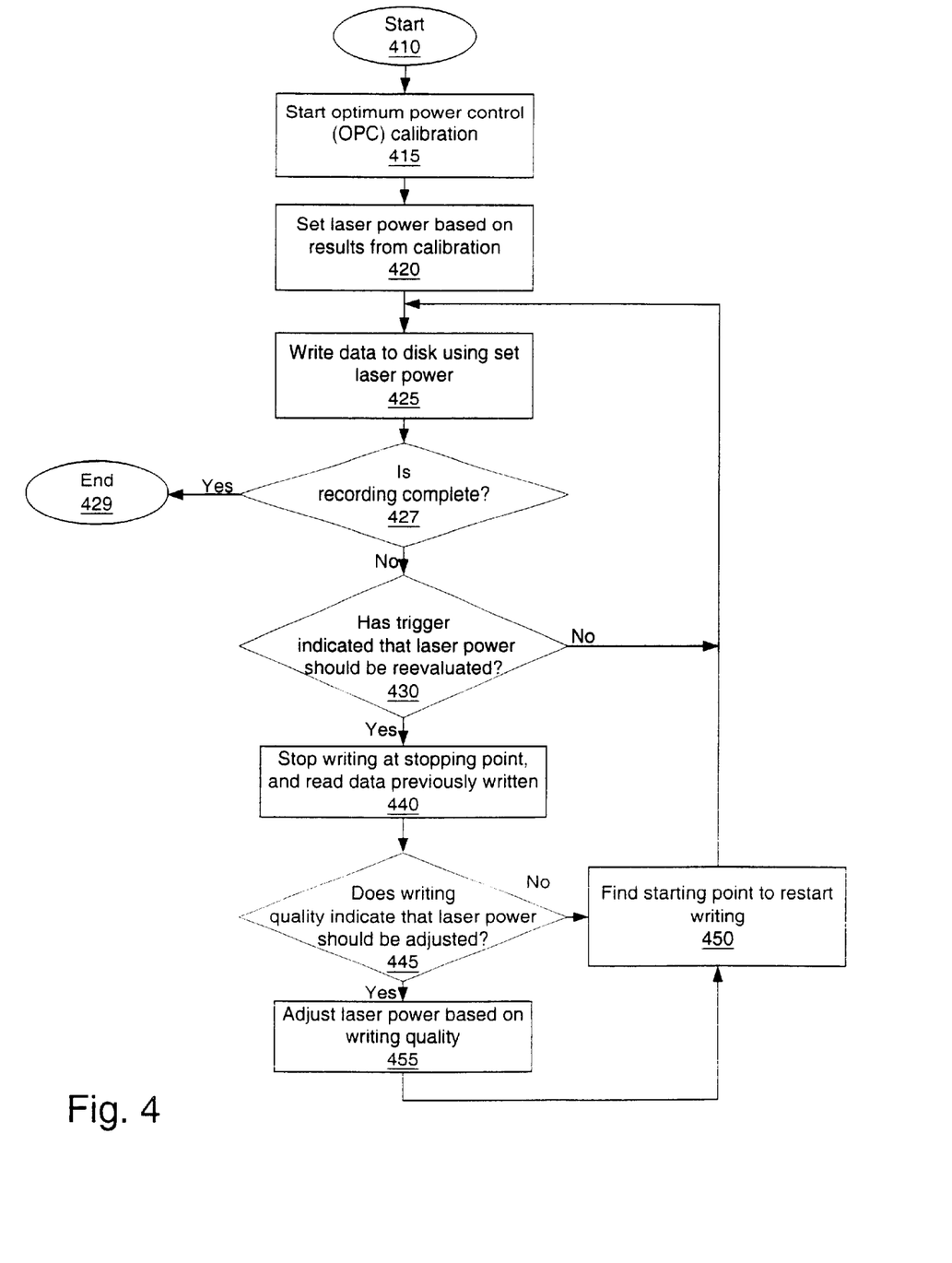
FIG. 4 is a flowchart of one embodiment of adjusting laser power during writing.

FIG. 4 is a flowchart of one embodiment of adjusting laser power during writing. The process starts at block 410 when writing is first initialized. At block 415, the optimum power control (OPC) calibration is started. This process writes test data to a test area of the disk, to determine a laser power and write strategy.

At block 420, the laser power and write strategy are set for writing, based on the analysis of the OPC calibration.

At block 425, actual data is written to the disk, using the write strategy and laser power set as a result of the OPC calibration.

At block 425, the process determines whether the recording is complete. The recording may be complete if all of the available data has been recorded, or if the disc is full. Although this is shown as a loop, for one embodiment the completion determination is interrupt driven. If the recording is complete, the process continues to block 429, and the recording process ends. Otherwise, the process continues to block 430.

At block 430, the process tests whether there has been a trigger that has indicated that the laser power should be reevaluated. If no such trigger has been triggered, the process returns to block 425, and continues writing. Otherwise, the process continues to block 440. Although this is shown as a loop, for one embodiment the triggers are interrupt driven. Thus, the system writes data, and the triggers monitor the various states. The system is unaware of the triggers, until the triggers send a signal.

At block 440, if a trigger has sent a signal, the writing is stopped and the data that has been previously written is read and analyzed. For one embodiment, the writing is stopped at the next programmable stopping point. The stopping point identifies at which portion of a large frame the writing stops. Thus, the stopping point may be some, small, time after the trigger has sent its signal. For one embodiment, the analysis of the previously written data includes comparing the data to the OPC data. For one embodiment, the analysis of the previously written data includes comparing the data to an ideal data.

At block 445, the process determines whether the writing quality indicates that the laser power or writing strategy should be adjusted. If the writing quality is not good, and the analysis determines that a change would improve the writing quality, the process continues to block 455.

If the laser power and writing strategy do not need adjustment, the process continues to block 450. At block 450, the starting point is found by the system, and the system restarts writing. For one embodiment, the starting point is a preprogrammed starting point. For one embodiment, the starting point is prior to the stopping point, such that there is a small overlap between the old writing and the new writing. The process then returns to block 425, to write data using the same laser power/writing strategy.

If the laser power and/or the writing strategy do need adjustment, the process continues to block 455. At block 455, the laser power and/or writing strategy is adjusted, based on the writing quality, as determined by the data previously written. The process then continues to block 450, to find the starting point, and restart writing with the new laser power/writing strategy.

For one embodiment, if the laser power or writing strategy are changed, a secondary stop some rotations later is inserted, to evaluate whether the new laser power/writing strategy is an improvement. This is triggered by the initial analysis trigger, described above.

The above described system permits a reevaluation of the write strategy and laser power at any time during the write process. This system is more precise than traditional OPC or ROPC methodologies since the actual data that was written with the selected power level and write strategy is evaluated. The quality of the data that is read back indicates whether the write power and write strategy are correct. The laser power and write strategy can then be adjusted appropriately, to produce a better quality read-back signal. Thus, the above described method improves the quality of the signal encoded on a disk.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   writing data to a disk using a write laser;
   halting recording at a stopping point, prior to an end of the disk;
   reading the data recorded on the disk;
   evaluating the data, and adjusting the characteristics of the write laser, if appropriate; and
   linklessly restarting the writing using the adjusted characteristics for the write laser, such that the restarted writing continues seamlessly from the stopping point.

2. The method of claim 1, wherein the characteristics comprise a power level of the write laser.

3. The method of claim 1, wherein the characteristics comprise a pulse shape written by the write laser.

4. The method of claim 1, wherein the evaluation comprises detecting one or more of the following characteristics of the data that was written: error rate, symmetry, and jitter.

5. The method of claim 1, wherein adjusting the characteristics compensates for one or more of the following: changes in tangential velocity, media coating, operating temperature of a laser diode or media, track radius, elapsed time since the characteristics were initially set, tilt, focus, and radial or vertical runout.

6. The method of claim 1, wherein halting the recording comprises:
   reaching an evaluation point;
   receiving a pre-programmed stopping point from a stopping logic; and
   stopping at the pre-programmed stopping point.

7. The method of claim 6, wherein restarting the recording comprises:
   receiving a pre-programmed starting point from the stopping logic; and
   starting at the pre-programmed starting point.

8. The method of claim 7, wherein the pre-programmed starting point is before the pre-programmed stopping point.

9. The method of claim 1, wherein recording is stopped periodically.

10. The method of claim 9, wherein recording is stopped when a timer has elapsed.

11. The method of claim 9, wherein recording is stopped when a preset amount of data has been recorded.

12. The method of claim 9, wherein recording is stopped at random times during the recording process.

13. The method of claim 9, wherein the recording is stopped when a change in a writing speed is detected.

14. The method of claim 9, wherein the recording is stopped when a temperature sensor indicates a sufficient change in temperature to affect the writing process.

15. The method of claim 9, wherein the recording is stopped when writing is changed from CAV to CLV.

16. The method of claim 9, wherein the recording is stopped, in a packet-type writing, at an end of a packet.

17. The method of claim 9, wherein the recording is stopped when a running optimum power control (ROPC) logic detects a sufficient difference between an optimum power control (OPC) period and the signals when the data is being written.

18. The method of claim 9, wherein the recording is stopped during a beginning of recording, to verify a result of an optimum power control (OPC) adjustment.

19. The method of claim 1, wherein the recording is stopped and restarted at least three times during an entire recording session.

20. The method of claim 1, wherein the compact disk is not a multi-session disk, and traditional compact disk readers are able to read the compact disk.

21. An apparatus comprising:
   a stopping logic to halt recording to a disk at a stopping point, prior to an end of the disk;
   a read data analysis logic to read the data recorded on the disk and to evaluate the data; and
   a laser adjust logic to adjust the characteristics of the write laser, if appropriate; and
   a start logic to restart recording linklessly such that the restarted writing continues seamlessly from the stopping point.

22. The apparatus of claim 21, wherein the characteristics comprise a power level of the write laser.

23. The apparatus of claim 21, wherein the characteristics comprise a pulse shape written by the write laser.

24. The apparatus of claim 21, wherein the read data analysis logic is further to detect one or more of the following characteristics of the data that was written: error rate, symmetry, and jitter.

25. The apparatus of claim 21, wherein adjusting the characteristics compensates for one or more of the following: changes in tangential velocity, media coating, operating temperature of a laser diode or media, track radius, and elapsed time since the characteristics were initially set.

26. The apparatus of claim 21, further comprising a trigger, the trigger to generate a stopping point, to stop the recording.

27. The apparatus of claim 26, wherein the trigger is a timer.

28. The apparatus of claim 27, wherein the timer stops the recording periodically.

29. The apparatus of claim 26, wherein the trigger is a temperature sensor to generate the stopping point when a temperature change of a sufficient degree occurs.

30. The apparatus of claim 26, wherein the trigger is a writing speed difference detector to generate the stopping point when a writing speed has changed by a sufficient amount.

31. The apparatus of claim 26, wherein the trigger is a CAV/CLV change logic to generate the stopping point when a recording mode is changed.

32. The apparatus of claim 26, wherein the trigger is an initial analysis logic, the initial analysis logic to generate the stopping point a short time after the recording is started, to verify that a the changed laser characteristics are appropriate.

33. The apparatus of claim 26, wherein the trigger is a running optimum power control logic to monitor a reflection of the laser during the write process, and to generate the stopping point if a characteristic of the laser has changed by a sufficient amount.

34. The apparatus of claim 26, wherein the recording is stopped, in a packet-type writing, at an end of a packet.

35. The apparatus of claim 21, wherein the recording is stopped and restarted at least three times during an entire recording session.

36. The apparatus of claim 21, wherein the compact disk is not a multi-session disk, and traditional compact disk readers are able to read the compact disk.

37. An apparatus comprising:
a write logic to write data to a disk using a write laser;
a stopping logic to halt recording at a stopping point, prior to an end of the disk;
a read logic to read the data recorded on the disk;
a read data analysis logic to evaluate the data;
a laser adjust logic to alter the characteristics of the write laser, if appropriate; and
the write logic to restarting the writing using the adjusted characteristics for the write laser, the write logic restarting the writing seamlessly.

38. The apparatus of claim 37, further comprising:
an optimal power control logic to set characteristics of the write laser in a power calibration area of the disk for writing data to the disk prior to initially writing data to the disk.

39. The apparatus of claim 37, wherein the characteristics comprise a power level of the write laser.

40. The apparatus of claim 37, wherein the characteristics comprise a pulse shape written by the write laser.

41. The apparatus of claim 37, further comprising:
a stop logic to receiving a pre-programmed stopping point when triggered by the stopping logic, the stop logic to halt recording at the pre-programmed stopping point.

42. The apparatus of claim 41, further comprising:
a start logic to receive a pre-programmed starting point when triggered by the laser adjust logic, the start logic further to start recording at the pre-programmed starting point.

43. The apparatus of claim 42, wherein the pre-programmed starting point is before the pre-programmed stopping point.

44. The apparatus of claim 37, further comprising a trigger to generate a stop point for the stopping logic.

* * * * *